(12) United States Patent
Sadhu et al.

(10) Patent No.: US 9,723,089 B2
(45) Date of Patent: Aug. 1, 2017

(54) CONSTRUCTING A DATA PIPELINE HAVING SCALABILITY AND LOW LATENCY

(75) Inventors: Praveen Sadhu, Sunnyvale, CA (US); Avanti Nadgir, Sunnyvale, CA (US); Akon Dey, Waitara (AU); Guru Golani, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 1274 days.

(21) Appl. No.: 12/423,421

(22) Filed: Apr. 14, 2009

(65) Prior Publication Data
US 2010/0260065 A1   Oct. 14, 2010

(51) Int. Cl.
G06F 15/16 (2006.01)
H04L 29/08 (2006.01)
H04L 12/24 (2006.01)
G06Q 30/02 (2012.01)

(52) U.S. Cl.
CPC ............. *H04L 67/20* (2013.01); *G06Q 30/02* (2013.01); *G06Q 30/0207* (2013.01); *G06Q 30/0256* (2013.01); *H04L 41/08* (2013.01); *H04L 67/26* (2013.01)

(58) Field of Classification Search
CPC ................................ G06Q 30/02; H04L 41/08
USPC ........................................................ 709/201
See application file for complete search history.

(56) References Cited

U.S. PATENT DOCUMENTS

| 6,782,531 | B2 | 8/2004 | Young |
| 7,287,180 | B1 * | 10/2007 | Chen et al. ............ 714/4.3 |
| 7,298,503 | B2 | 11/2007 | Christiansen et al. |
| 7,505,962 | B2 | 3/2009 | Shariff et al. |
| 2002/0016835 | A1 * | 2/2002 | Gamerman ............ 709/223 |
| 2007/0016696 | A1 | 1/2007 | Jerrard-Dunne et al. |
| 2007/0027754 | A1 * | 2/2007 | Collins et al. ............ 705/14 |
| 2009/0006375 | A1 * | 1/2009 | Lax et al. ................ 707/5 |
| 2009/0131025 | A1 | 5/2009 | Sharma et al. |
| 2010/0049586 | A1 | 2/2010 | Shahshahani |

OTHER PUBLICATIONS

U.S. Appl. No. 12/423,491, filed Apr. 14, 2009, Nadgir et al., Office Action dated Jan. 25, 2011 and May 11, 2011.
U.S. Appl. No. 12/423,491, filed Apr. 14, 2009, Nadgir.

* cited by examiner

*Primary Examiner* — Kevin Mai
(74) *Attorney, Agent, or Firm* — James J. DeCarlo; Greenberg Traurig, LLP

(57) ABSTRACT

A method and a system are provided for constructing a data pipeline having scalability and low latency. In one example, the system provides a primary data distributor cluster. The system provides one or more non-primary data distributor clusters. The system arranges a cascade configuration that includes the primary data distributor cluster and the one or more non-primary data distributor clusters.

16 Claims, 5 Drawing Sheets

CONSTRUCTING A DATA PIPELINE HAVING SCALABILITY AND LOW LATENCY

FIELD OF THE INVENTION

The invention relates to streams of events performed out by end users on a network. More particularly, the invention relates to constructing a data pipeline having scalability and low latency.

BACKGROUND

An advertiser, such as Ford® or McDonald's®, generally contracts a creative agency for ads to be placed in various media for the advertiser's products. Such media may include TV, radio, Internet ads (e.g., banner display ads, textual ads, streaming ads, mobile phone ads) or print media ads (e.g., ads in newspapers, magazines and posters). It is quite possible that the advertiser may engage one or more creative agencies that specialize in creating ads for one or more of the above media. A company wants to show the most relevant ads to end users in order to get the most value from their ad campaign.

A company like Yahoo!® gathers enormous amounts of data related to IP (Internet Protocol) addresses of end user computers. For example, the company may gather event data, including data related to end user behavior on the Internet. Such behavior may include, for example, clicks on ads. The company sees IP addresses from which the company can usually infer zip codes and even street-level data. The company sees login information and sees the pages that end users visit. The company may infer age, gender, income and other demographic information from analyzing the pages an end user visits even if the end user never does a search. The company may also gather valuable search data when end users perform search queries. All of this data is highly valuable to any company that advertises because the data may help the company advertise in the most effective way.

The search advertising marketplace generates billions of dollars in revenue each year for a search engine company like Yahoo!®. The search marketing marketplace works on a cost-per-click (CPC) model. When an end user performs a search query online and clicks on a sponsored search text ad, a company like Yahoo!® is paid by the respective consumer (e.g., advertiser). End users tend to click on more relevant ads.

A consumer (e.g., advertiser) that utilizes data from a search engine wants to show the most relevant ads to end users in order to get more clicks on the consumer's ads. In order to do this, the consumer needs to gather end users' events, such as search behavior, click behavior and other browsing behavior. The company may then use these events to target relevant ads to different end users.

In the CPC model, there are two important events that go through a data pipeline—search events and click events. Search events occur when an end user performs a search query. Click events occur when an end user clicks on a sponsored text ad. Web servers of a company like Yahoo!® collect search events when an end user performs a query on the company's search page. URLs of the ads on the search result webpage may contain the click event information. A consumer (e.g., advertiser) may want to collect and analyze the search and click events in order to build a model for query-to-text ad relevance. If the consumer can learn which ads are more relevant, then the consumer can target these ads to end users and get a higher click-through rate (CTR).

The amount of data gather by a search engine company, such as Yahoo!®, is tremendous. The amount of data is typically in the order of petabytes per day. Unfortunately, conventional systems for providing events to consumers (e.g., advertisers) are inefficient.

SUMMARY

What is needed is an improved method having features for addressing the problems mentioned above and new features not yet discussed. Broadly speaking, the invention fills these needs by providing a method and a system for constructing a data pipeline having scalability and low latency.

In one embodiment, a method is described for constructing a data pipeline having scalability and low latency, the method comprises the following: providing a primary data distributor cluster; providing one or more non-primary data distributor clusters; and arranging a cascade configuration that includes the primary data distributor cluster and the one or more non-primary data distributor clusters.

In another embodiment, a system is described for constructing a data pipeline having scalability and low latency, wherein the system is configured for the following: providing a primary data distributor cluster; providing one or more non-primary data distributor clusters; and arranging a cascade configuration that includes the primary data distributor cluster and the one or more non-primary data distributor clusters.

In still another embodiment, a computer readable medium comprises one or more instructions for constructing a data pipeline having scalability and low latency, wherein the one or more instructions, when executed by one or more processors, cause the one or more processors to perform the following steps: providing a primary data distributor cluster; providing one or more non-primary data distributor clusters; and arranging a cascade configuration that includes the primary data distributor cluster and the one or more non-primary data distributor clusters.

The invention encompasses other embodiments configured as set forth above and with other features and alternatives. It should be appreciated that the invention can be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

DETAILED DESCRIPTION

Figure 1:
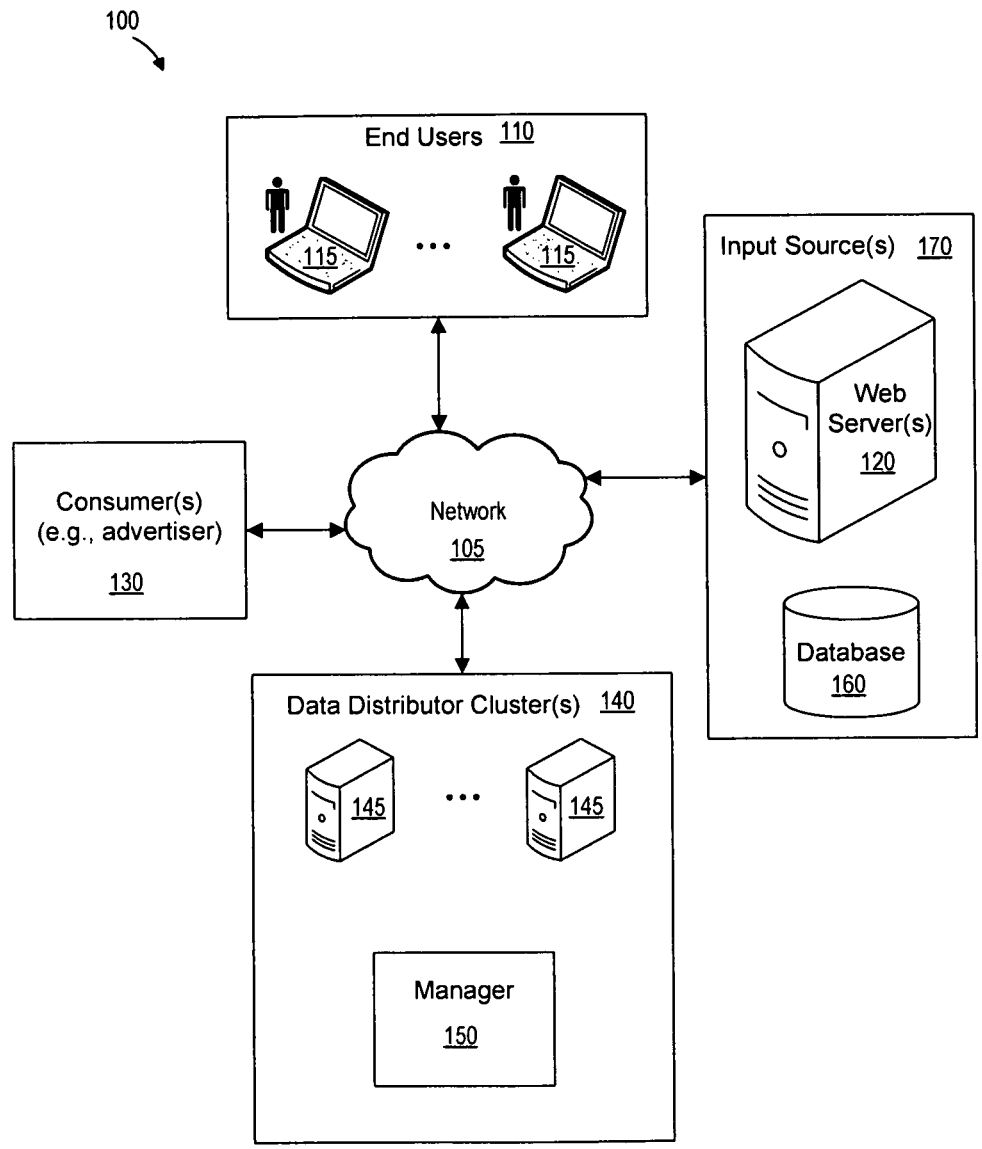
FIG. 1 is a high-level block diagram of a system for constructing a data pipeline having scalability and low latency, in accordance with some embodiments of the invention.

An invention is disclosed for a method and a system for constructing a data pipeline having scalability and low latency. Numerous specific details are set forth in order to provide a thorough understanding of the invention. It will be understood, however, to one skilled in the art, that the invention may be practiced with other specific details.

DEFINITIONS

Some terms are defined below for clarity purposes. These terms are not rigidly restricted to these definitions. A term may be further defined by its use in other sections of this description.

"Advertiser" means an entity that is in the business of advertising a product. An advertiser may include without limitation a seller and/or a third-party agent for the seller.

"Client" means the client part of a client-server architecture. A client is typically a user device and/or an application that runs on a user device. A client typically relies on a server to perform some operations. For example, an email client is an application that enables a user to send and receive e-mail via an email server. The computer running such an email client may also be referred to as a client.

"Computer" (e.g., "user computer" or "client" or "server") may refer to a single computer or to a network of interacting computers. A computer is a combination of a hardware system, a software operating system and perhaps one or more software application programs. Examples of a computer include without limitation a laptop computer, a palmtop computer, a smart phone, a cell phone, a mobile phone, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Consumer" means an entity that seeks to obtain events. Examples of a consumer include without limitation an advertiser and an advertiser agent. The term "consumer" may refer to a consumer device, depending on the context. A consumer device is a computer that a consumer may use to communicate with a data distributor and/or a network, among other things.

"Data distributor" means a device configured to process events for one or more consumer devices. A data distributor typically receives an events stream from an input source and processes events according to plug-in components that are defined by one or more consumer devices.

"Data distributor cluster" means a group of one or more data distributors. A data distributor cluster receives preferably one event stream from one or more input sources.

"Database" means a collection of data organized in such a way that a computer program may quickly select desired pieces of the data. A database is an electronic filing system. In some instances, the term "database" is used as shorthand for "database management system".

"Device" means hardware, software or a combination thereof. A device may sometimes be referred to as an apparatus. Examples of a device include without limitation a software application such as Microsoft Word®, a laptop computer, a database, a server, a display, a computer mouse, and/or a hard disk.

"End user" means a user of a user device. An end user is typically a person who seeks to acquire a product or service. For example, an end user may be a woman who is browsing Yahoo!® Shopping for a new cell phone to replace her current cell phone.

"Event" means data related to an action carried out by an end user. Examples an event include without limitation click information, login information, and/or search information, among other types of information.

"Event stream" means a stream of data related to actions that are carried out by one or more end users. For example, a data distributor may receive an event stream from a web server that receives events from end users.

"Input source" means a source that provides an event stream to a data distributor. Examples of an input source include without limitation a network, a database and/or a disk (e.g., local disk or disk filer), among other sources.

"Marketplace" means a world of commercial activity where products and/or services are browsed, bought and/or sold. A marketplace may be located over a network, such as the Internet. A marketplace may also be located in a physical environment, such as a shopping mall.

"Network" means a connection, between any two or more computers, that permits the transmission of data. A network may be any combination of networks, including without limitation the Internet, a local area network, a wide area network, a wireless network and a cellular network.

"Offramp engine" means one or more processors configured to carry out the processing for a data distributor. The offramp engine typically receives an event stream from an input source and processes the event stream according to an offramp layout and plug-in components.

"Offramp layout" means a set of instructions that specify how an offramp is to process plug-in components. A manager of a data distributor preferably configures an offramp layout to process an event stream according to plug-in components provided by consumer devices.

"Pipeline" means any part of a connection between user devices and consumer devices. An event stream travels through a pipeline from user devices to consumer devices. The event stream may undergo a number of different processing steps along a pipeline. For example, a data distributor, along a pipeline, may process an event stream after receiving events from a web server and before sending events to a consumer device.

"Plug-in component" means a set of rules and metrics that specify events that a consumer device has requested to receive. A plug-in component is preferably configured by a consumer device. Examples of a plug-in component include without limitation, filters, projections, partitions, transports and/or transformations, among other components. These examples are further defined below with reference to FIG. 3.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User device" (e.g., "user computer", "client", or "client device") may refer to a single computer or to a network of interacting computers. A computer is defined above.

"Web browser" means any software program which can display text, graphics, or both, from Web pages on Web sites. Examples of a Web browser include without limitation Mozilla Firefox® and Microsoft Internet Explorer®.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo® Web server.

"Web site" means at least one Web page, and more commonly a plurality of Web pages, virtually connected to form a coherent group.

Overview of Architecture

FIG. 1 is a high-level block diagram of a system 100 for constructing a data pipeline having scalability and low latency, in accordance with some embodiments of the invention. A device is hardware, software or a combination thereof. A device may sometimes be referred to as an apparatus. Each device may be configured to carry out one or more steps of the method for constructing a data pipeline having scalability and low latency.

The network 105 couples together one or more end users 110, one or more input sources 170, one or more consumer(s) 130, and one or more data distributor clusters 140. The network 105 may be any combination of networks, including without limitation the Internet, a local area network, a wide area network, a wireless network and/or a cellular network. The input sources 170 may include without limitation the network 105, one or more web servers 120, a database 160 and/or a disk, among other sources. The end users 110 communicate over the network 105 by using the user devices 115. An end user 110 may be, for example, a person browsing or shopping on the Internet.

The consumers 130 are entities that are seeking to market products and/or services to the end users 110. Examples of a consumer 130 include without limitation an advertiser and an advertiser agent (e.g., Yahoo!®).

The data distributor cluster(s) 140 may include without limitation a manager 150 and one or more data distributors 145. The manager 150 may be, for example, an administrator who is capable of configuring the data distributor cluster(s) 140. The data distributors 145 may be configured to provide data about end users 110 to the consumers 130. The data distributors 145 may be located anywhere in the network 105. For example, the data distributors 145 may be dispersed at multiple locations around the world or may be located within a single location. The manager 150 preferably manages the data distributor cluster(s) 140. The data distributor cluster(s) 140 may be configured to process a real-time event stream. For example, a web server 120 may send a real-time event stream to the data distributor cluster(s) 140. Alternatively, the system 100 may store an event stream on a database 160, or on another storage device, for later processing by the data distributor cluster(s) 140.

The data distributor cluster(s) 140 carries out the more important operations of the system 100. A system for processing an event stream for a data pipeline is described in further detail below with reference to FIG. 3.

Figure 2:
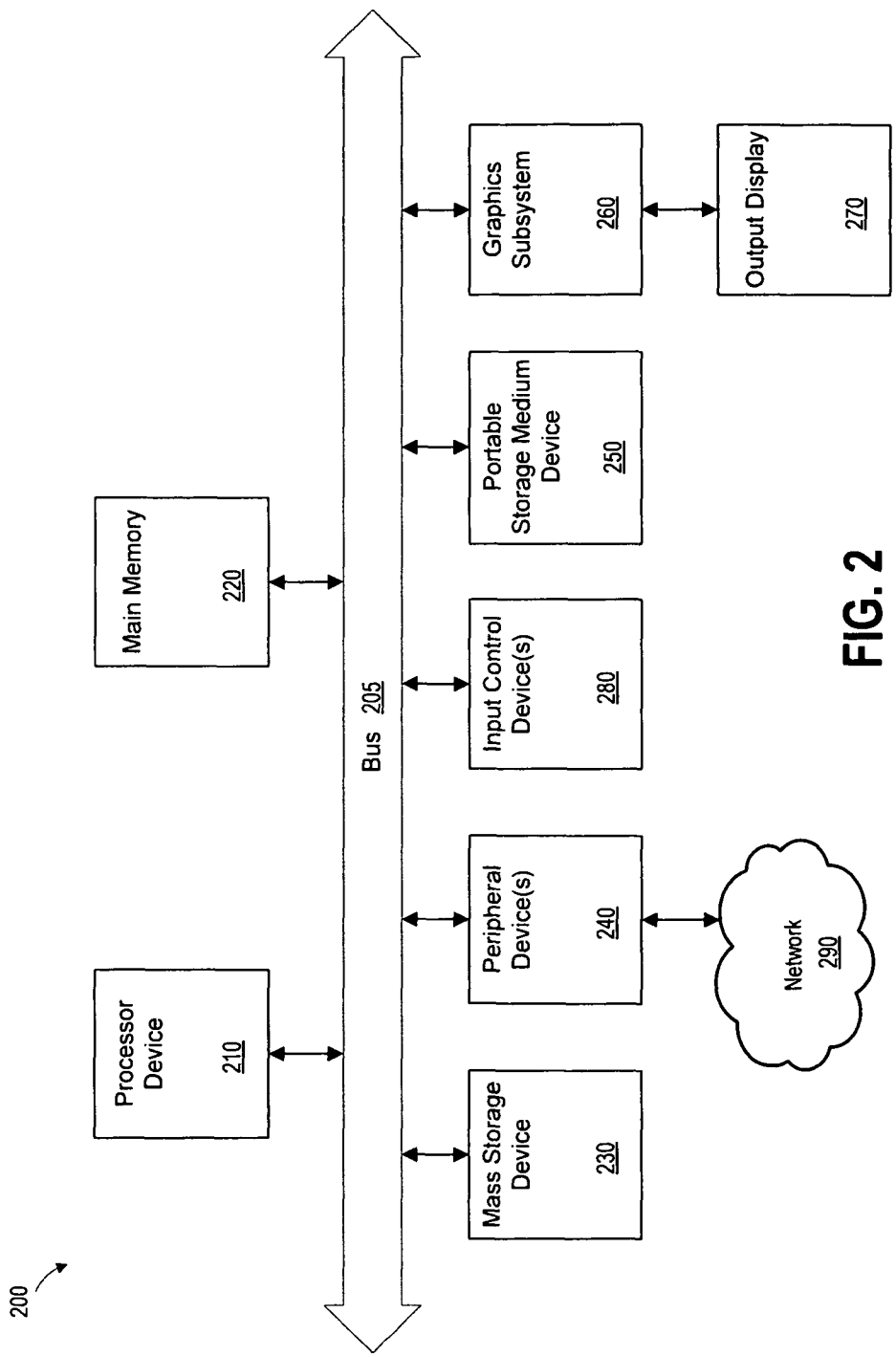
FIG. 2 is a high-level block diagram of a general/special purpose computer system 200, in accordance with some embodiments.

FIG. 2 is a high-level block diagram of a general/special purpose computer system 200, in accordance with some embodiments. The computer system 200 may be, for example, a user device, a user computer or a server computer, among other things. The computer system 200 preferably includes without limitation a processor device 210, a main memory 220, and an interconnect bus 205. The processor device 210 may include without limitation a single microprocessor, or may include a plurality of microprocessors for configuring the computer system 200 as a multi processor system. The main memory 220 stores, among other things, instructions and/or data for execution by the processor device 210. If the system for constructing a data pipeline is partially implemented in software, then the main memory 220 stores the executable code when in operation. The main memory 220 may include banks of dynamic random access memory (DRAM), as well as cache memory.

The computer system 200 may further include a mass storage device 230, peripheral device(s) 240, portable storage medium device(s) 250, input control device(s) 280, a graphics subsystem 260, and/or an output display 270. For explanatory purposes, all components in the computer system 200 are shown in FIG. 2 as being connected via the bus 205. However, the computer system 200 is not so limited. The computer system 200 may be connected through one or more data transport means. For example, the processor device 210 and/or the main memory 220 may be connected via a local microprocessor bus. The mass storage device 230, peripheral device(s) 240, portable storage medium device(s) 250, and/or graphics subsystem 260 may be connected via one or more input/output (I/O) buses. The mass storage device 240 is preferably a nonvolatile storage device for storing data and/or instructions for use by the processor device 210. The mass storage device 230, which may be implemented, for example, with a magnetic disk drive or an optical disk drive. In a software embodiment, the mass storage device 230 preferably stores the software of the method for constructing a data pipeline for loading into the main memory 220.

The portable storage medium drive 250 operates in conjunction with a nonvolatile portable storage medium, such as, for example, a compact disc read only memory (CD ROM), to input and output data and code to and from the computer system 200. In some embodiments, the software of the method for constructing a data pipeline may be stored on a portable storage medium, and may be inputted into the computer system 200 via the portable storage medium drive 250. The peripheral device(s) 240 may include any type of computer support device, such as, for example, an input/output (I/O) interface configured to add additional functionality to the computer system 200. For example, the peripheral device(s) 240 may include a network interface card for interfacing the computer system 200 to a network 290.

The input control device(s) 280 provide a portion of the user interface for a user of the computer system 200. The input control device(s) 280 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 200 preferably includes the graphics subsystem 260 and the output display 270. The output display 270 may include a cathode ray tube (CRT) display and/or a liquid crystal display (LCD). The graphics subsystem 260 receives textual and graphical information, and processes the information for output to the output display 270.

Components of the computer system 200 may represent a broad category of computer components of a general/special purpose computer. Embodiments of the computer system 200 are not limited to the specific implementations provided here.

Constructing a Data Pipeline Having Scalability and Low Latency

Figure 5:
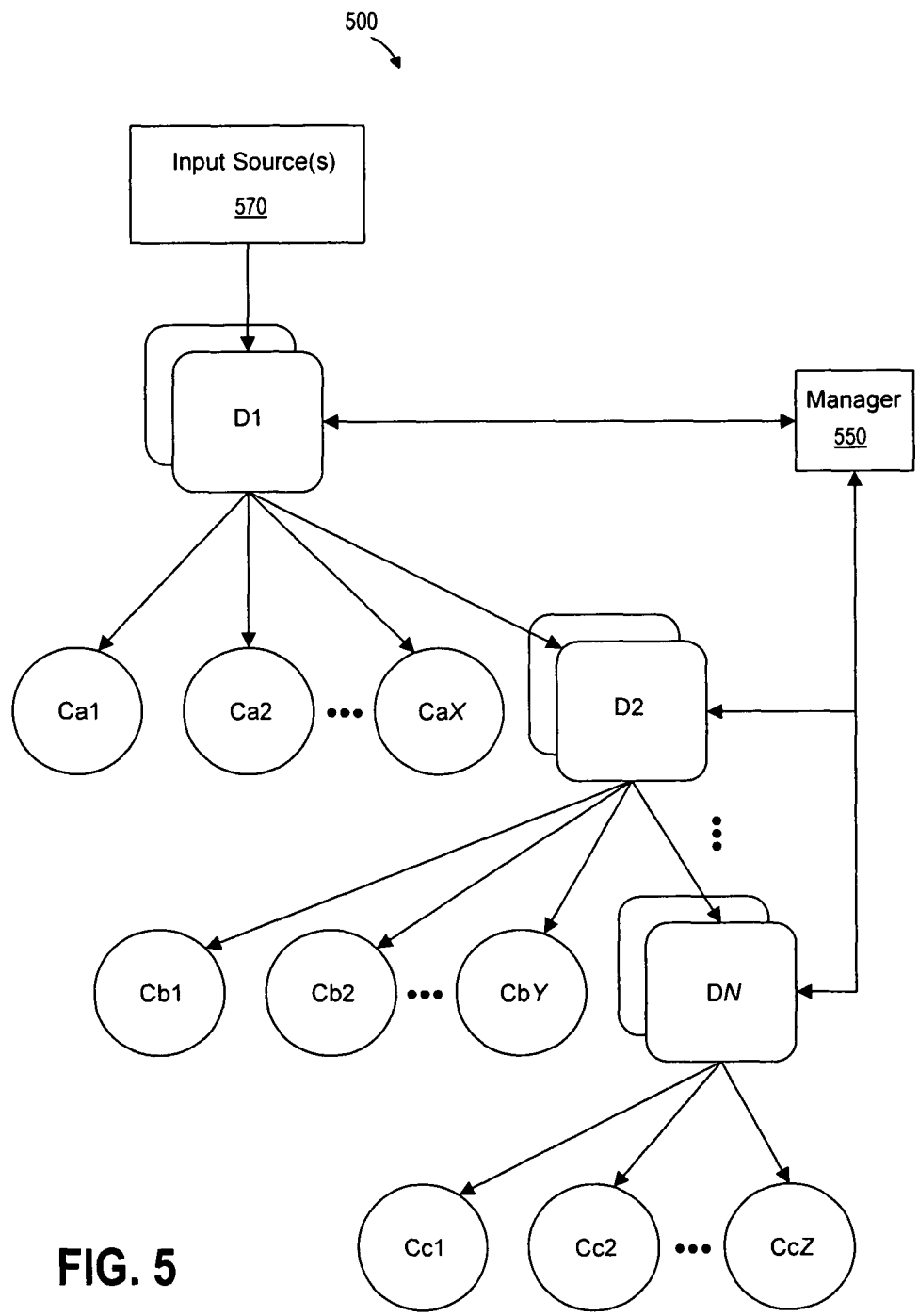
FIG. 5 is a high-level schematic diagram of a system for constructing a data pipeline having scalability and low latency, in accordance with some embodiments.

FIG. 5 is a high-level schematic diagram of a system 500 for constructing a data pipeline having scalability and low latency, in accordance with some embodiments. The system 500 includes without limitation one or more input sources 570, one or more data clusters D1 . . . DN, one or more consumer devices Ca1 . . . CaX, one or more consumer devices Cb1 . . . CbY, and one or more consumer devices Cc1 . . . CcZ, where N, X, Y and Z are positive integers.

Each data distributor cluster includes one or more data distributors. For example, data distributor cluster D1 may include one or more data distributors, while data distributor cluster D2 may include one or more data distributors, and so on. Data distributor cluster D1 may be referred to as the primary data distributor cluster. A data distributor in distributor cluster D1 may be referred to as a primary data distributor. Data distributor clusters D2 . . . DN may be referred to as non-primary data distributor clusters. A data distributor in one of the distributor clusters D2 . . . DN may be referred to as a non-primary data distributor.

A manager 550 is coupled to the one or more data distributor clusters D1 . . . DN. The manager 550 manages the one or more data distributors clusters D1 . . . DN. The manager 550 may include an administrator that is capable of managing the one or more data distributor clusters D1 . . . DN. The manager 550 may include a device configured for managing automatically the data distributor clusters D1 . . . DN. The software may be automated by using any programming technique suitable for configuring the organization of the one or more data distributor clusters D1 . . . DN.

The system 500 is configured for delivering data to multiple consumer devices with multiple data requirements. The system 500 may scale to multiple data distributor clusters and to multiple consumer devices (e.g., hundreds of consumer devices). As is readily apparent in FIG. 5, the system 500 includes one or more data distributors D1 . . . DN in a cascade configuration.

The system 500 may scale up to relatively large amounts of data. For example, the system 500 may filter petabytes of events over a number of hours (e.g., 24 hours).

One or more data distributors of the system 500 may be located within one data distributor cluster. For example, one or more data distributors may be located within data distributor cluster D1, while one or more data distributors may be located within data distributor cluster D2, and so on.

One or more data distributors may be distributed across multiple data distributor clusters D1 . . . DN. The system 500 provides support for multiple data distributor clusters D1 . . . DN. The multiple data distributor clusters D1 . . . DN may be located at multiple locations.

The system 500 provides the ability to dynamically add and/or remove consumer devices without shutting down a data distributor. For example, the manager 550 may add and/or remove consumer devices without shutting down any data distributors in the one or more data distributor clusters D1 . . . DN.

The system 500 may be configured to use multiple parallel connections. For example, consumer devices Ca1 . . . CaX are arranged in a parallel configuration, while consumer devices Cb1 . . . CbY are arranged in a parallel configuration, and so on. The parallel connections may be, for example, TCP (transfer control protocol) connections. Such a parallel configuration will help to increase available bandwidth and to minimize data transfer latency.

The system 500 is configured to deliver data (e.g. events) at a latency that is substantially low (e.g., seconds latency), given the available bandwidth resources. The system 500 is configured for streaming data (e.g., events) across the one or more data distributor clusters D1 . . . DN by using one event stream. The one or more data distributor clusters D1 . . . DN may receive the one event stream from one or more input sources 570.

Overview of Method for Constructing a Data Pipeline

Figure 4:
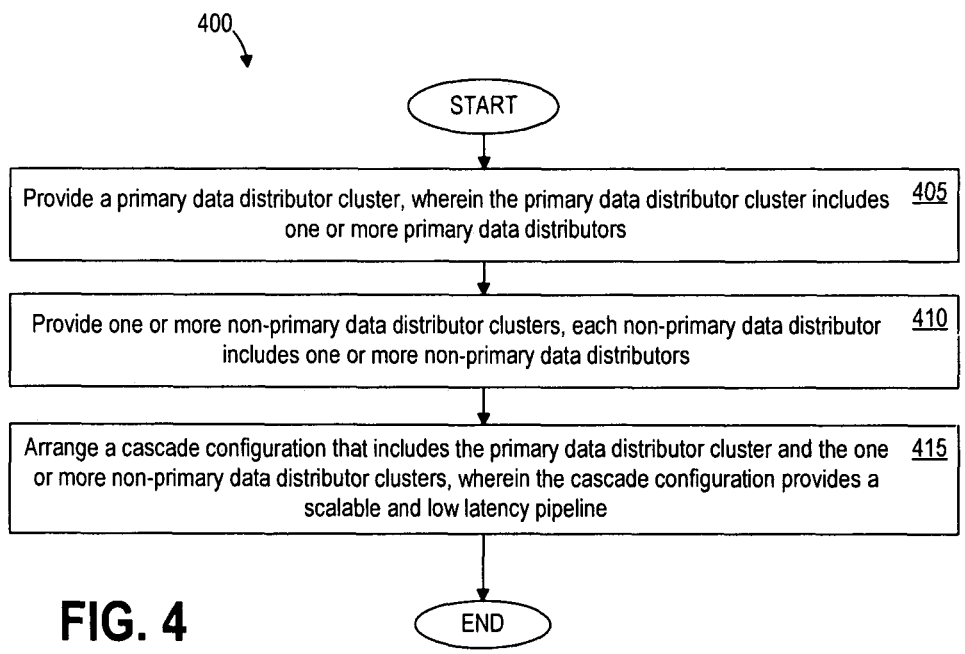
FIG. 4 is a flowchart of a method for constructing a data pipeline having scalability and low latency, in accordance with some embodiments.

FIG. 4 is a flowchart of a method 400 for constructing a data pipeline having scalability and low latency, in accordance with some embodiments. In some implementations, the steps of the method 400 may be carried out by the manager 550 of FIG. 5. One or more other devices may carry out at least some of the method 400.

The method 400 starts in a step 405 where the system provides a primary data distributor cluster. The primary data distributor cluster includes one or more primary data distributors. The method 400 then moves to a step 410 where the system provides one or more non-primary data distributor clusters. Each non-primary data distributor includes one or more non-primary data distributors. Next, in a step 415, the system arranges a cascade configuration that includes the primary data distributor cluster and the one or more non-primary data distributor clusters. The cascade configuration provides a pipeline having scalability and low latency. The method 400 concludes after the step 415.

Note that the method 400 may include other details and steps that are not discussed in this method overview. Other details and steps are discussed above with reference to the appropriate figures and may be a part of the method 400, depending on the embodiment.

Processing an Event Stream for a Data Pipeline

Figure 3:
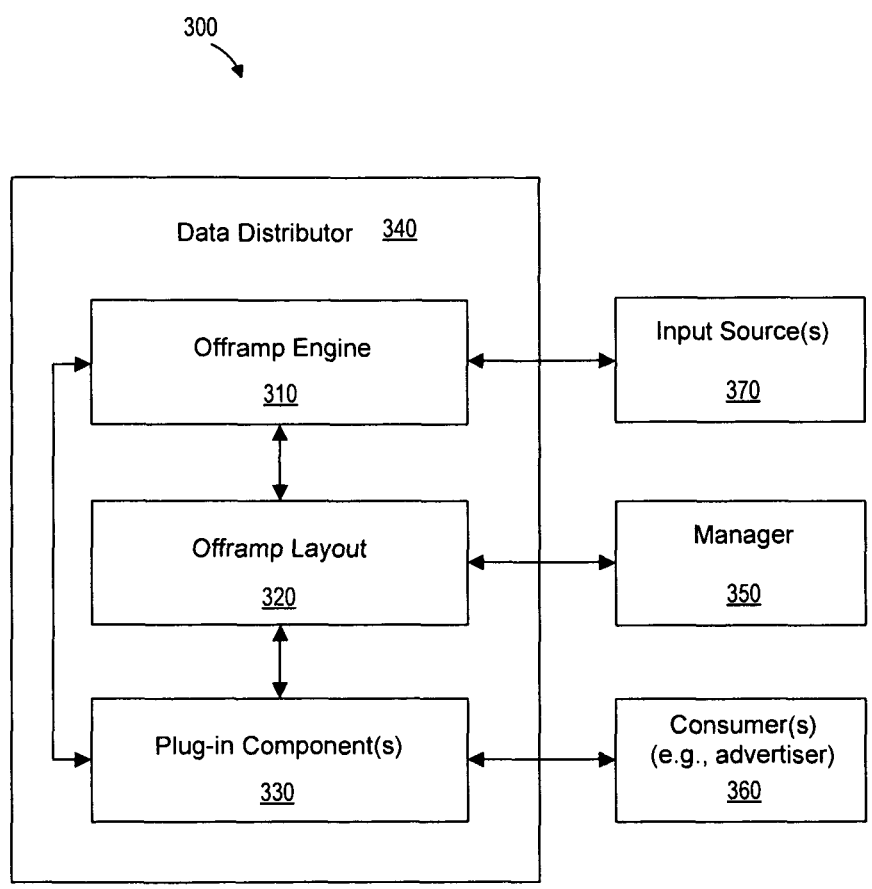
FIG. 3 is a high-level schematic diagram of a system for processing an event stream for a data pipeline, in accordance with some embodiments.

FIG. 3 is a high-level schematic diagram of a system 300 for processing an event stream for a data pipeline, in accordance with some embodiments. A purpose of FIG. 3 is to provide a more detailed explanation of the internal devices of a data distributor 340. The system 300 includes without limitation a data distributor 340 that may be coupled to one or more input sources 370, a manager 350, and one or more consumers 360. The data distributor 340 may include without limitation an offramp engine 310, an offramp layout 320, and one or more plug-in components 330.

The data distributor 340 allows data flowing in data pipelines to be filtered, partitioned, projected, transported and/or transformed with custom plug-ins based on one or more consumer requirements. The data pipeline is received from one or more input sources 370. An input source may include, for example, a network, a database, and/or disk (e.g., local disk or disk filer), among other input sources. Data preferably flows through the pipeline in a substantially real-time manner. For example, event stream data may flow in a real-time pipeline from user devices on a network, such as the Internet. Alternatively, data does not flow in a real-time manner. For example, data may be received from a database that stores event stream data from user devices on a network, such as the Internet.

Data pipelines carry events from input sources 370 to one or more consumers 360. In real-time data pipelines, multiple consumers 360 typically require filtering and/or other criteria to be applied to the events. The data distributor 340 provides such filtering and/or other criteria to be applied to the events. The data distributor 340 preferably processes the events without duplicating the processing and with keeping the latency of the pipeline relatively low.

The data distributor 340 allows a consumer to configure the one or more plug-in component(s) 330. A plug-in component 330 is a device (e.g., software and/or hardware) that may provide an interface for a consumer 360 to specify events that are of interest. For example, the interface may be provided over a website on the Internet. A plug-in component 330 provides to a consumer 360 the ability to add and/or remove a filter, a projection, a partition, a transport and/or a transformation, among other things.

A filter is a plug-in component that specifies which events to process from a set of events. For example, a consumer 360 may specify a plug-in component 330 that configures the data distributor 340 to filter events coming from an input source 370. The input source may be a Korean network, which may send all events in the Korean network to the data distributor 340. The filter may configure the data distributor 340 to send to the consumer 360 events about only male end users in Korea. Other examples exist as well.

A projection is a plug-in component that specifies the subset of a particular event stream that is needed. For example, a consumer 360 may want events about people shopping online in Australia. However, the consumer 360 may need only certain portions/fields of the events. The projection may specify, for example, to provide the consumer 360 with requested portions/fields of events about people shopping online in Australia. Such portions/fields may include, for example, times of events, information about web servers to which users are connected, etc. Using the projection provided by the consumer 360, the data distributor 340 may extract the requested portions/fields from the event stream. Other examples exist as well.

A partition is a plug-in component that specifies how events are to be separated for a particular consumer. For example, a partition may specify a separation between events pertaining browsing in the United States from events pertaining to browsing in Japan. Other examples exist as well.

A transport is a plug-in component that specifies the manner in which events are to be delivered to the consumer device. For example, a transport may specify that the events are to be delivered to a particular location, such as an IP (Internet Protocol) address. Other examples exist as well.

A transformation is a plug-in component that specifies how events are to be transformed into another type of data. For example, a transformation may specify that the events are to be encrypted or changed into another data format before being sent to a consumer 360. Other examples exist as well.

The manager 350 may include an administrator that is capable of configuring the data distributor 340, including the offramp layout 320. Alternatively, the configuration offramp layout may be an automated process that involves receiving the plug-in components and automatically generating the layout. The automation may use any programming technique suitable for building a data tree.

The offramp layout 320 is preferably a device that provides a data tree of rules and metrics that specify how the offramp engine 310 processes the plug-in components 330. The offramp layout 320 may include instructions that specify how the offramp engine 310 may efficiently process event streams according to the plug-in components 330. The offramp layout 320 may provide the order in which plug-in components 330 are to be processed. The offramp layout 320 may instruct the offramp engine 310 to process plug-in components 330 by using parallel processing and/or by using serial processing. The plug-in components 330 may include multiple plug-in components from multiple different consumers 360. The offramp layout 320 is preferably configured to substantially eliminate unnecessary processing duplications.

For example, a first consumer device may specify a plug-in component for receiving events about teenagers in California. A second consumer device may specify a plug-in component for receiving events about teenagers in the United States. In such a case, the offramp layout 320 may instruct the offramp engine 310 to process, for both consumer devices, events about teenagers in California. The offramp layout 320 may then instruct the offramp engine 310 to process, for the second consumer device, events about teenagers in all other states besides California. In this manner, the offramp layout 320 provides instructions according to which the offramp engine 310 is to process efficiently the plug-in components 330. Other examples exist as well.

Accordingly, the offramp engine 310 preferably loads the offramp layout 320 and the plug-in components 330. The offramp engine 310 may process event streams according to plug-in components 330 as organized by the offramp layout 320. The offramp engine 310 may be configured to read from different types of input sources 370. Examples of input sources 370 include without limitation a network, a database and/or disk (e.g., local disk or disk filer), among other input sources. The offramp engine 310 may be configured to serve multiple consumers 360. The offramp engine 310 may be configured to process the plug-in components, which are custom event processing specifications. The offramp engine 310 is configured to perform stream processing of events. For example, the offramp engine 310 may dynamically process events as the data is received from an input source 370. The processing is preferably performed in a real time manner.

The data distributor 340 is preferably clustered with other data distributors to increase efficiency of processing events. The manager 350 preferably configures the input sources 370 and the offramp layout. The one or more consumers 360 preferably configure the plug-in components. Thus, consumer devices may receive streaming filtered events from a data distributor cluster.

Computer Readable Medium Implementation

Portions of the invention may be conveniently implemented by using a conventional general purpose, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments may also be implemented by the preparation of application-specific integrated circuits or by interconnecting an appropriate network of conventional component circuits.

Some embodiments of the system for constructing a data pipeline may include a computer program product which is a storage medium/media having instructions stored thereon/therein which can be used to control, or cause, a computer to perform any of the processes of the invention. The storage medium may include without limitation floppy disk, mini disk, optical disc, Blu-ray Disc, DVD, CD-ROM, microdrive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable medium/media, some implementations include software for controlling both the hardware of the general/special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming/software of the general/special purpose computer or microprocessor are software modules for implementing the processes described above. The processes described above may include without limitation the following: providing a primary data distributor cluster; providing one or more non-primary data distributor clusters; and arranging a cascade configuration that includes the primary data distributor cluster and the one or more non-primary data distributor clusters.

Advantages

The system for providing a scalable and low latency data pipeline will help consumers to increase revenues. The system provides a framework that works efficiently with latency bound applications. A latency bound application is an application that requires a relatively quick or efficient real-time response. The system helps build such latency applications that may require data within seconds of the data generation. One example of a latency bound application is behavioral targeting. In behavioral targeting, the consumer (e.g., advertiser) may want to target a user during the user's browsing session and/or before the user's next click.

The system minimizes bandwidth usage by using a single data stream instead of multiple consumer streams across data centers. For example, the system may receive one event stream into the data distributor cluster. Instead of receiving multiple event streams into the data distributor cluster, the one event stream may be configured to provide the requested data to multiple consumer devices.

Consumer devices of the data (e.g., events) do not have to be in the same location where the data gets generated. For example, a data center that filters data does not have to be in the same location as the consumer device that is receiving the filtered data.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

receiving event data of an event stream at an event data distributor of an event data distributor cluster of a plurality of event data distributor clusters, the plurality of event data distributor clusters comprising a primary event data distributor cluster and at least one non-primary event data distributor cluster, the plurality of event data distributor clusters being arranged in series, in a cascade configuration, and forming an event stream data pipeline for processing the event stream, and each event data distributor cluster distributing, to a plurality of event consumers associated with the event data distributor cluster, data resulting from the event stream data pipeline processing, each primary event data distributor cluster and each non-primary event data distributor cluster comprising a number of event data distributors, each event data distributor of the number comprising a computing device, the event stream comprising a plurality of events collected from online user behavior comprising online search, click and browse behavior received from a plurality of end user computing devices;

providing, by the event data distributor, a number of plug-in component interfaces to a plurality of computing devices of the plurality of event consumers, each interface corresponding to one of a number of plug-in components;

receiving, by the event data distributor from the number of plug-in component interfaces provided to the plurality of computing devices of the plurality of event consumers, a number of event specifications from the plurality of event consumers, each received event specification of the received event specifications corresponding to an event consumer of the plurality and identifying which collected events of the plurality are of interest to the event consumer, the one or more plug-in component interfaces comprising an interface of a partitioning plug-in component from which partitioning information to be processed by the partitioning plug-in component is received, the partitioning information specifying a manner in which the event stream is to be partitioned in accordance with interests of the plurality of event consumers, a number of partitions of the event stream comprising a partitioning of online user browser behavior for at least one geographic area that is of interest to at least one of the plurality of event consumers;

processing, by the event data distributor using the one or more plug-in components, the received event data of the event stream to identify, for each event consumer of the plurality of event consumers, data about each event of the plurality that is of interest to each event consumer of the plurality, the event data distributor processing the one or more plug-in components in an order determined by the event data distributor; and sending, by the event data distributor over an electronic communications network to a computing device of each event consumer of the plurality of event consumers, the data about the one or more events of the plurality from the event stream in accordance with each event consumer's interest, the data sent to an event consumer's computing device resulting in the event consumer's computing device processing the data sent to the event consumer's computing device to identify at least one advertisement to present at one or more end user computing devices.

2. The method of claim 1, further comprising:
providing, by the event data distributor, pipeline data to a non-primary event data distributor of a non-primary event data distributor cluster in the series, in the cascade configuration, forming the event stream data pipeline.

3. The method of claim 1, wherein each event data distributor cluster of the cascade configuration is configured to service two or more event consumers of the plurality.

4. The method of claim 1, wherein the event stream is received from at least one of:
a network;
an Internet;
a database;
a disk; and
a disk filer.

5. The method of claim 1, wherein a manager is coupled to the cascade configuration, and wherein the manager is configured to automatically manage the cascade configuration.

6. The method of claim 1, wherein the cascade configuration is scalable to accommodate a data pipeline exceeding 1 petabyte of data per one day and the event stream data pipeline has low latency.

7. The method of claim 1, each of the one or more event consumers is at least one of:
an advertiser; and
an advertiser agent.

8. A system comprising:
an event data distributor of an event data distributor cluster of a plurality of event data distributor clusters, the plurality of event data distributor clusters comprising a primary event data distributor cluster and at least one non-primary event data distributor cluster, the plurality of event data distributor clusters being arranged in series, in a cascade configuration, and forming an event stream data pipeline for processing the event stream, and each event data distributor cluster distributing, to a plurality of event consumers associated with the event data distributor cluster, data resulting from the event stream data pipeline processing, each primary event data distributor cluster and each non-primary event data distributor cluster comprising a number of event data distributors, each event data distributor of the number comprising a computing device, the computing device comprising one or more processors and a storage medium for tangibly storing thereon program logic for execution by the one or more processors, the stored program logic comprising:
receiving logic executed by the one or more processors for receiving event data of an event stream, the event stream comprising a plurality of events collected from online user behavior comprising online search, click and browse behavior received from a plurality of end user computing devices;
providing logic executed by the one or more processors for providing a number of plug-in component interfaces to a plurality of computing devices of the plurality of event consumers, each interface corresponding to one of a number of plug-in components;
receiving logic executed by the one or more processors for receiving, from the number of plug-in component interfaces of a number of plug-in components provided to the plurality of computing devices of the plurality of event consumers, a number of event specifications from the plurality of event consumers, each received event specification of the received event specifications corresponding to an event consumer of the plurality and identifying which collected events of the plurality are of interest to the event consumer, the one or more plug-in component interfaces comprising an interface of a partitioning plug-in component from which partitioning information to be processed by the partitioning plug-in component is received, the partitioning information specifying a manner in which the event stream is to be partitioned in accordance with interests of the plurality of event consumers, a number of partitions of the event stream comprising a partitioning of online user browse behavior for at least one geographic area that is of interest to at least one of the number of event consumers;
processing logic executed by the one or more processors for processing, using the one or more plug-in components, the event data stream to identify, for each event consumer of the plurality of event consumers, data about each event of the plurality that is of interest to each event consumer of the plurality, the processing logic processing the one or more plug-in components in an order determined by the event data distributor; and
sending logic executed by the one or more processors for sending, over an electronic communications network to a computing device of each event consumer of the plurality of event consumers, the data about the one or more events to the plurality from the event stream in accordance with each event consumer's interest, the data sent to an event consumer's computing device resulting in the event consumer's computing device processing the data sent to the event consumer's computing device to identify at least one advertisement to present at one or more end user computing devices.

9. The system of claim 8, the stored program logic further comprising:
providing logic executed by the one or more processors for providing pipeline data to a non-primary data distributor of a non-primary event data distributor cluster in the series, in the cascade configuration, forming the event stream data pipeline.

10. The system of claim 8, wherein each event data distributor cluster of the cascade configuration is configured to service two or more event consumers of the plurality.

11. The system of claim 8, wherein the cascade configuration is configured to receive one event stream, wherein the one event stream may be received from one or more input sources.

12. The system of claim 11, wherein the event stream is received from at least one of:
a network;
an Internet;
a database;
a disk; and
a disk filer.

13. The system of claim 8, wherein a manager is coupled to the cascade configuration, and wherein the manager is configured to automatically manage the cascade configuration.

14. The system of claim 8, wherein the cascade configuration is scalable to accommodate a data pipeline exceeding one petabyte of data per one day and the event stream data pipeline has low latency.

15. The system of claim 8, each of the one or more event consumers is at least one of:
an advertiser; and
an advertiser agent.

16. A non-transitory computer readable medium carrying one or more processor-executable instructions:

the instructions for an event data distributor of an event data distributor cluster of a plurality of event data distributor clusters, the plurality of event data distributor clusters comprising a primary event data distributor cluster and at least one non-primary event data distributor cluster, the plurality of event data distributor clusters being arranged in series, in a cascade configuration, and forming an event stream data pipeline for processing the event stream, and each event data distributor cluster distributing, to a plurality of event consumers associated with the event data distributor cluster, data resulting from the event stream data pipeline processing, each primary event data distributor cluster and each non-primary event data distributor cluster comprising a number of event data distributors, each event data distributor of the number comprising one or more processors for processing event streams, the instructions, when executed, cause an event data distributor's one or more processors to:

receive event data of an event stream, the event stream comprising a plurality of events collected from online user behavior comprising online search, click and browse behavior received from a plurality of end user computing devices;

provide a number of plug-in component interfaces to a plurality of computing devices of a plurality of event consumers, each interface corresponding to one of a number of plug-in components;

receive, from the number of plug-in component interfaces provided to the plurality of computing devices of the plurality of event consumers, a number of event specifications from the plurality of event consumers, each received event specification of the received event specifications corresponding to an event consumer of the plurality and identifying which collected events of the plurality are of interest to the event consumer, the one or more plug-in component interfaces comprising an interface of a partitioning plug-in component from which partitioning information to be processed by the partitioning plug-in component is received, the partitioning information specifying a manner in which the event stream is to be partitioned in accordance with interests of the plurality of event consumers, a number of partitions of the event stream comprising a partitioning of online user browse behavior for at least one geographic area that is of interest to at least one of the plurality of event consumers;

process, using the one or more plug-in components, the event stream to identify, for each event consumer of the plurality of event consumers, data about each event of the plurality that is of interest to each event consumer of the plurality, the event data distributor processing the one or more plug-in components in an order determined by the event data distributor; and send, over an electronic communications network to a computing device of each event consumer of the plurality of event consumers, the data about the one or more events of the plurality from the event stream in accordance with each event consumer's interest, the data sent to an event consumer's computing device resulting in the event consumer's computing device processing the data sent to the event consumer's computing device to identify at least one advertisement to present to one or more end user computing devices.

\* \* \* \* \*